May 2, 1967            E. FELD ET AL           3,316,591
DEVICE FOR CONVERTING PASTY MATERIAL INTO VERMICULAR
THREADS PRIOR TO DRYING

Filed June 8, 1965

United States Patent Office 3,316,591
Patented May 2, 1967

3,316,591
DEVICE FOR CONVERTING PASTY MATERIAL INTO VERMICULAR THREADS PRIOR TO DRYING
Erich Feld and Werner Kleinlein, Frankfurt am Main, and Reinhardt Liebenhoff, Kelkheim, Taunus, Germany, assignors to Farbwerke Hoechst Aktiengesellschaft vormals Meister Lucius & Bruning, Frankfurt am Main, Germany, a corporation of Germany
Filed June 8, 1965, Ser. No. 462,284
Claims priority, application Germany, June 16, 1961, F 34,183
6 Claims. (Cl. 18—12)

The present application is a continuation-in-part application of our application Ser. No. 201,619, filed June 11, 1962, now abandoned.

The object of the invention is a process and a device for converting organic dyestuff pastes, especially filter press cakes of organic pigments, into dimensionally stable, vermicular threads.

Organic dyestuff pastes, especially pastes that are obtained in the form of filter press cakes of organic pigments, generally consist of about 40 to about 80% by weight of liquid, mostly water, and about 60 to about 20% by weight of solids, mostly very fine particles having a size of about 100μ to less than 5μ.

Pastes of the aforesaid type have a complicated rheological behavior and, therefore, it is rather difficult to prepare them for drying in a manner such that as large a surface as possible comes into contact with the drying medium.

It is known to convert gelatinous, plastic or viscous masses into endless, vermicular or ribbon-like bodies prior to drying. For this purpose the masses are pressed through slotted or perforated plates, for example by means of an extruder. Organic dyestuff pastes cannot be converted into threads by this process. At most a few dripping wet stumps are pressed through the slotted or perforated plate. Then the apparatus comes to a standstill because the orifices are clogged by the formation of bridges of the material to be treated.

Another known device for extruding gelatinous or plastic masses consists of a shaft closed at the lower end with a sieve plate or a perforated plate and provided with shaking means. The material is transported through the orifices under the pressure of its own weight and by shaking the shaft. A device of this type is likewise unsuitable for converting organic dyestuff pastes into vermicular threads. The shaking readily provokes demixing of the pastes and the sieve plate or perforated plate is soon clogged by the formation of bridges.

For preparing pellets of extrudable material a device has been described in which the material is fed to a rotating, perforated drum by means of a spiral blade assembly, on the inner surfaces of which drum rotate rollers in planetary arrangement, which force the material through the orifices of the drum. Using this principle for organic dyestuff pastes does not result in the formation of threads because the pastes either demix or strongly liquefy due to the high mechanical stress. Moreover, in this case, too, the orifices are clogged after a short while by the formation of bridges.

The present invention provides a process for converting organic dyestuff pastes, especially filter press cakes of organic pigments, into endless, dimensionally stable threads by pressing the material through a sieve plate or a perforated plate. The material is conveyed to a substantially horizontal cylinder by means of a pressure-producing conveying element, which cylinder is closed at both ends and provided at the lower side with perforations through which the material is pressed. In the cylinder scraping devices are provided which rotate or oscillate around the axis of the cylinder or reciprocate in the direction of the axis and have a dimension such that they do not fully cover the perforations in any position and periodically pass over the perforations at a distance of at most 0.5 mm.

The process of the invention enables organic dyestuff pastes, especially filter press cakes of organic pigments, which by known processes can be pressed even through large orifices having a diameter of 10 mm. and thereabove with great difficulty only, to be converted into dimensionally stable endless threads having a diameter of at most 10 mm. to 1 mm. The dimensional stability of the threads is so good that they can be piled up on the belt of a drier in a heap having a height of, for example, 40 mm. and transported to a drying process without the masses agglomerating or falling in. In order that aggregations of the threads form on the belt of the drier, the speed of the belt, measured in meters per second, is at most one half of the issuing speed of the vermicular threads, likewise measured in meters per second.

The device according to the invention for converting pasty materials into vermicular threads comprises a substantially horizontal cylinder closed at both ends and provided with perforations in the underside thereof at least over part of its length, a supply conduit for receiving the pasty material in the upper half of its circumference, that is to say at the upper side, at one side or at one end, and a scraping member inside said cylinder adapted to revolve or to oscillate around the axis of the cylinder or to reciprocate in the direction of the axis and to pass periodically over the wall of the cylinder covering only part of the perforations while thereover and having a distance of at most 0.5 mm. at least in the perforated area.

The scraping member may be a strip of sheet metal which is fixed on a shaft inside of the cylinder by means of radial arms. Instead of the strip a wire may be used. The scraping device may also be a screw conveyor which simultaneously conveys the material towards the end or the ends of the cylinder. In the embodiment of the device of the invention comprising a scraping element reciprocating in the direction of the cylinder axis, this element advantageously consists of a strip of sheet metal radially fixed on the axis, which strip is in vertical position with respect to the perforated area of the cylinder and on the border of which facing the said perforated area scraping wires are provided.

The device according to the invention is diagrammatically illustrated with reference to the accompanying drawings.

Figure 1:
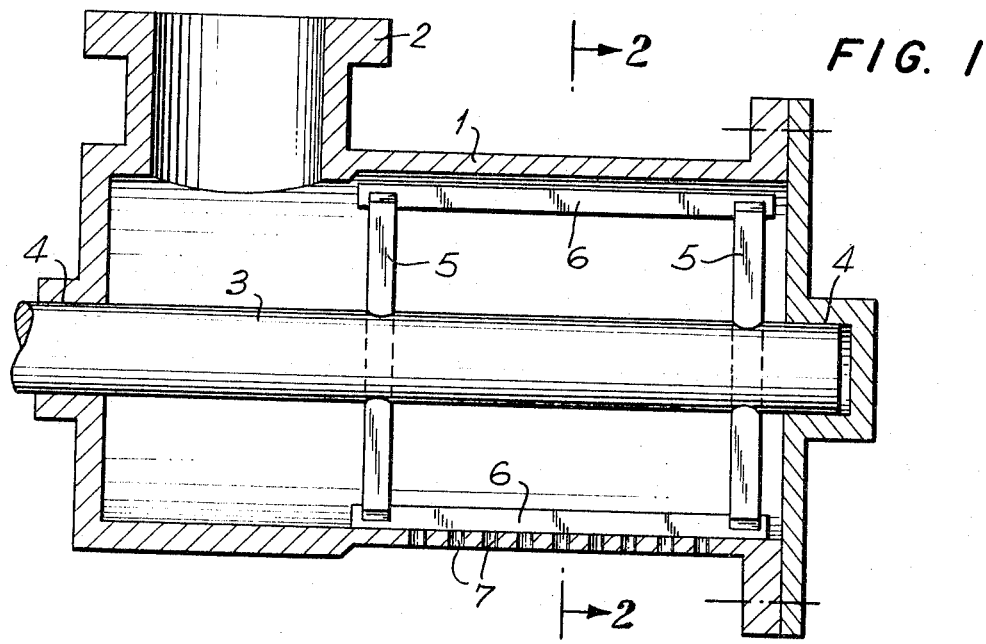
FIGURE 1 is a longitudinal section of the device with scraping members revolving around the axis of the cylinder.
Figure 3:
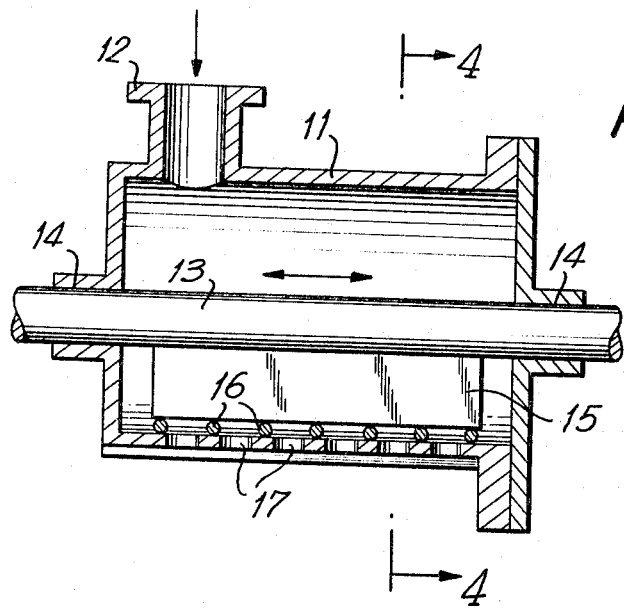
FIGURE 3 is a longitudinal section of a device with scraping members reciprocating in the direction of the axis.
Figure 5:
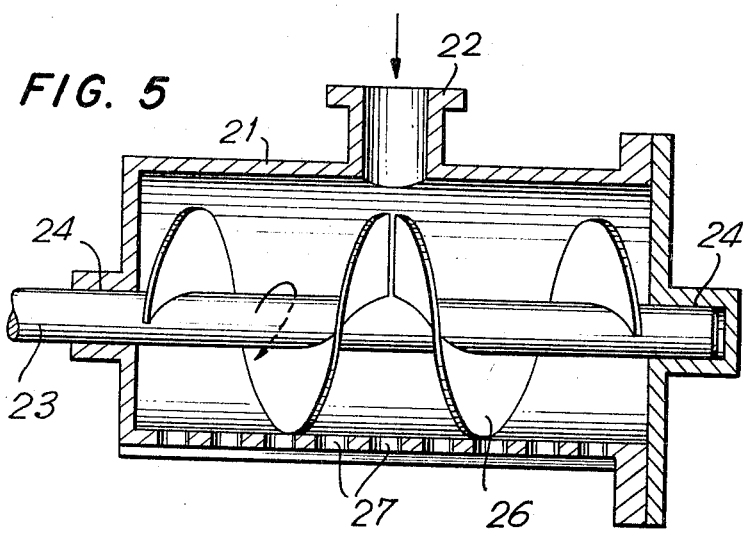
FIGURE 5 is a longitudinal section of a device in which the scraping member is a conveyor screw.

Referring to FIGURES 1 to 5:

A horizontal cylinder 1, which is closed at both ends, is provided with a supply conduit 2 through which the material to be treated is conveyed into the cylinder by means of a pressure-producing conveyor, for example a pump, not shown. The supply conduit 2 can be located on the upper side of the cylinder, as shown in the drawing, or on one side or on one end of the cylinder, without departing from the scope of the invention. Cylinder 1 is provided with perforations 7 at its under side, which may reach over a part of the cylinder as shown in FIGURE 1, or over the whole length of the cylinder as shown in FIGURES 3 and 5. The diameter of perforations 7 shall suitably be greater than the thickness of the cylinder wall in the perforated area.

Figure 2:
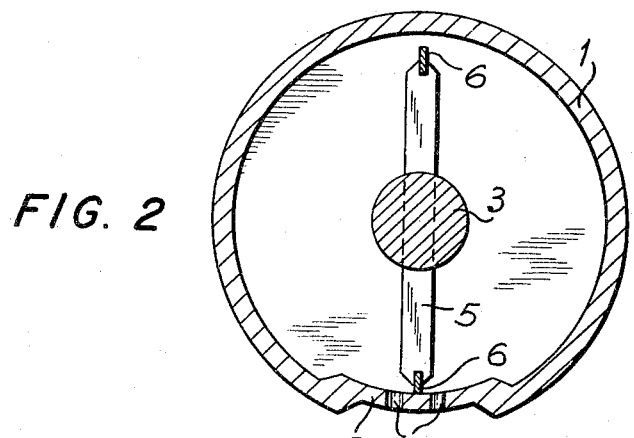
FIGURE 2 is a cross section along line 2—2 of FIG. 1.

In bearings 4 in the end closures of cylinder 1 a shaft 3 rotates concentrically to the axis of the said cylinder. In the embodiment according to FIGURE 3 shaft 13 reciprocates in bearings 14 in the direction of the cylinder axis. In FIGURES 1 and 2 shaft 3 is provided with radial arms 5 on which are fixed metal strips 6 in parallel position with respect to the axis of the shaft. Instead of the said metal strips, wires can be used with the same effect. When the shaft does not rotate but oscillates it is sufficient to provide arms 5 with metal strips or wires 6 only on that side facing the perforated area of the cylinder. In the embodiment according to FIGURES 3 and 4 shaft 13 reciprocates in bearings 14 in the direction of the cylinder axis. In this case the scraping member consists of a metal strip 15 fixed on shaft 13 in radial position with respect to the axis of the cylinder and provided with scraping wires 16. In FIGURE 5 conveyor screws 26 serve as scraping elements which simultaneously convey the material to be treated from the centrally arranged supply conduit 22 to both ends of cylinder 21.

On principle, the cylinder may have an annular cross section. However, it has proved advantageous to use a cylinder in which the inner surface of the perforated area 8 has a smaller radius of curvature than the imperforate portion of the said cylinder. By this means the scraping elements closely pass over the inner surface of the cylinder wall in the area of perforation only, while it is spaced from the said wall over the imperforate portion of the cylinder so that undesired mixing and kneading of the material is avoided. In the embodiment according to FIGURES 3 and 4 it is suitable to use a cylinder the perforated area of which is plane, i.e. without curvature.

Figure 6:
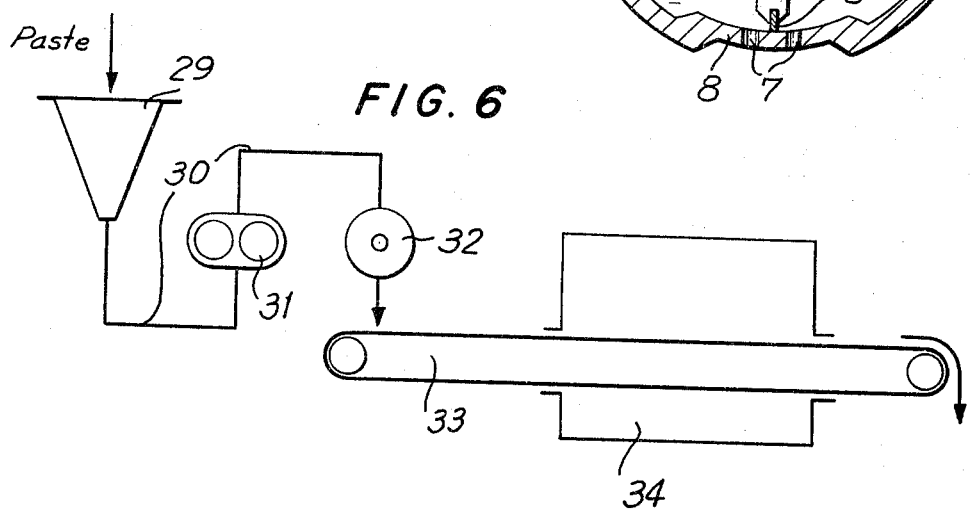
FIGURE 6 is a flow scheme to illustrate the position of the device according to the invention in a driving arrangement.

The flow scheme of FIGURE 6 illustrates the installation of the device according to the invention in a drying arrangement. The material to be treated is conveyed from container 29 by means of a pressure-producing conveyor 31, for example a gear pump, through conduit 30 into cylinder 32 provided with a perforated area and scraping elements. The material leaves the said cylinder in the form of vermicular, dimensionally stable threads and piles up on the belt 33 of a belt drier 34. In order that a heap of vermicular threads piles up on the belt the speed of the said belt is adjusted in a manner such that it is at most one half of the issuing speed of the threads in meter per second. The vermicular threads are suitably dried with hot air.

The following examples serve to illustrate the invention but they are not intended to limit it thereto.

EXAMPLE 1

A filter press cake of a red azo pigment (permanent red) was converted to vermicular threads in a device as shown in FIGURE 1 and dried on a belt drier. The material consisted of 75% of water and 25% of solid. The average particle size of the solid was $2\mu$. The cylinder had a length of 50 cm. and a diameter of 8 cm. On its under side it was provided with two rows of perforations. Each perforation had a diameter of 3 mm. and the wall thickness in the perforated area was 1 mm. In the perforated area the scraping element was spaced 0.2 mm. from the cylinder wall. The scraping element revolved at a speed of 200 revolutions per minute. Under pressure of 1.5 atmospheres gauge and under the specified conditions the threads issued at a rate of 0.08 meter per second. The belt of the drier moved at a rate of 0.02 meter per second.

EXAMPLE 2

Figure 4:
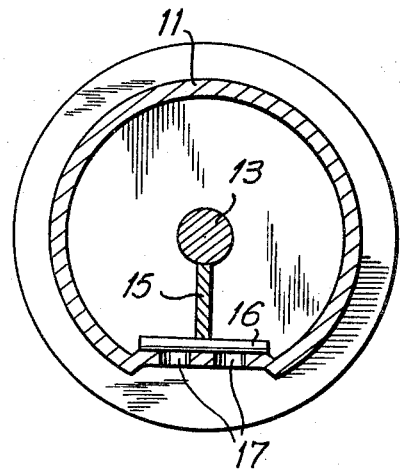
FIGURE 4 is a cross section along line 4—4 of FIGURE 3.

A filter press cake of 85% of water and 15% of benzidine yellow having an average particle size of $8\mu$ was converted into vermicular threads in a device as shown in FIGURE 4. The perforations in the cylinder wall had a diameter of 4 mm. and the wall in the perforated area had a thickness of 2 mm. The scraping element oscillated 80 times per minute with a motion of 6 mm. and at a distance of 0.1 mm. over the perforated area. Under pressure of 0.5 atmosphere gauge the threads issued at a rate of 0.06 meter per second. The belt moved at a rate of 0.03 meter per second.

EXAMPLE 3

A filter press cake of a yellow azo pigment (Hansa yellow) consisting of 70% of water and 30% of solid having an average particle size of $3\mu$ was converted into vermicular threads in a device as shown in FIGURE 5. The wall of the cylinder in the perforated area had a thickness of 1 mm., while the perforations had a diameter of 2 mm. The pressure was 2 atmospheres gauge. The screw conveyors rotated 15 times per minute at a distance of 0.03 mm. from the perforated area of the cylinder wall. The threads issued at a rate of 0.03 meter per second, the belt of the drier advanced at a rate of 0.01 meter per second.

We claim:

1. A device for continuously converting pasty material into vermicular threads prior to drying of the material which comprises a substantially horizontal cylinder closed at its ends and having a plurality of perforations in its underside along at least a part of its length, the diameter of said perforations being larger than the thickness of the cylinder wall in the area of the perforations, a conduit connected to the upperside of said cylinder and adjacent to one end thereof to receive and transport said pasty material into said cylinder, and scraping means within said cylinder having an axially mounted movable shaft, scraper support means extending from said shaft and an elongated scraper having a thickness less than the diameter of said perforations, said scraping means being held by said support means and adapted to pass intermittently over the inner surface of the perforated part of said cylinder at a distance of up to 0.5 mm. from said surface to cover only partly said perforations while thereover, whereby pasty material fed into said device through said conduit is extruded through said perforations as vermicular threads under the influence of said scraping means.

2. A device for converting filter press cakes of organic dyestuffs into endless vermicular threads by pressing through perforations comprising a substantially horizontal cylinder closed at both ends and provided with perforations in the underside thereof over at least a portion of its length, a supply conduit for receiving the material to be treated in the upper half of its circumference, and within said cylinder a scraping element on a shaft adapted to pass periodically over the perforations at a distance of at most 0.5 mm. at least in the perforated area and to cover only part of the said perforations while thereover, the inner surface of the perforated area of said cylinder having a radius of curvature smaller than the radius of curvature of the imperforate portion of said cylinder.

3. A device for converting filter press cakes of organic dyestuffs into endless vermicular threads by pressing through perforations comprising a substantially horizontal cylinder closed at both ends and provided with perforations in the underside thereof over at least a portion of its length, a supply conduit for receiving the material to be treated in the upper half of its circumference, and within said cylinder a scraping element on a shaft adapted to pass periodically over the perforations at a distance of at most 0.5 mm. at least in the perforated area and to cover only part of the said perforations while thereover, the wall thickness of said cylinder in the perforated area being less than the diameter of the perforations.

4. A device for converting pasty material into continuous vermicular threads prior to drying of the material which comprises a substantially horizontal closed cylinder having perforations in the underside thereof over at least a portion of its length, the inner surface of said cylinder in the perforated portion being substantially flat, a supply conduit in said cylinder for receiving said pasty material under pressure and for conducting it into the cylinder, and a scraping member inside said cylinder adapted to pass periodically over said perforations and to cover only a part of said perforations while thereover.

5. A device for converting pasty material into continuous vermicular threads prior to drying of the material which comprises a substantially horizontal closed cylinder having perforations in the underside thereof over at least a portion of its length, the inner surface of said cylinder in the perforated portion having a radius of curvature smaller than the radius of curvature of the inner surface of said cylinder in the imperforate portion, a supply conduit in said cylinder for receiving said pasty material under pressure and for conducting it into the cylinder, and a scraping member inside said cylinder adapted to pass periodically over said perforations and to cover only a part of said perforations while thereover.

6. A device for converting pasty material into continuous vermicular threads prior to drying of the material which comprises a substantially horizontal closed cylinder having perforations in the underside thereof over at least a portion of its length, said perforations having a diameter of from 1 to 10 mm. and the wall thickness of said cylinder in the perforated portion being less than the diameter of the perforations, a supply conduit in said cylinder for receiving said pasty material under pressure and for conducting it into the cylinder, and a scraping member inside said cylinder adapted to pass periodically over said perforations and to cover only a part of said perforations while thereover.

References Cited by the Examiner

UNITED STATES PATENTS

| | | |
|---|---|---|
| 693,750 | 2/1902 | Smith. |
| 1,980,898 | 11/1934 | Abernethy _____ 18—12A X |
| 2,063,404 | 12/1936 | Selman. |
| 2,437,460 | 3/1948 | Francisci. |
| 2,775,788 | 1/1957 | Andrew. |
| 2,979,769 | 4/1961 | Andrew. |

FOREIGN PATENTS 259,119  10/1926  Great Britain.

ALEXANDER H. BRODMERKEL, *Primary Examiner.*

J. H. WOO, *Assistant Examiner.*